United States Patent
Kwon et al.

(10) Patent No.: US 9,348,195 B2
(45) Date of Patent: May 24, 2016

(54) METHOD OF OPERATING WAVELENGTH SWEPT SOURCE APPARATUS

(71) Applicant: ELECTRONICS AND TELECOMMUNICATIONS RESEARCH INSTITUTE, Daejeon (KR)

(72) Inventors: Oh Kee Kwon, Daejeon (KR); Kwang Ryong Oh, Daejeon (KR); minhyup Song, Gyeonggi-do (KR); Chul-Wook Lee, Daejeon (KR); Jang Uk Shin, Daejeon (KR); Young-Tak Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/951,311

(22) Filed: Nov. 24, 2015

(65) Prior Publication Data

US 2016/0077404 A1  Mar. 17, 2016

Related U.S. Application Data

(62) Division of application No. 14/104,454, filed on Dec. 12, 2013.

(30) Foreign Application Priority Data

Jun. 19, 2013 (KR) .................. 10-2013-0070374

(51) Int. Cl.
G02F 1/35 (2006.01)
G02F 1/365 (2006.01)
G02F 1/383 (2006.01)

(52) U.S. Cl.
CPC .............. $G02F\ 1/3532$ (2013.01); $G02F\ 1/365$ (2013.01); $G02F\ 1/383$ (2013.01); G02F 2001/354 (2013.01); G02F 2203/56 (2013.01)

(58) Field of Classification Search
CPC ....... G02F 1/365; G02F 1/3532; G02F 1/377; G02F 1/383
See application file for complete search history.

(56) References Cited

U.S. PATENT DOCUMENTS 5,477,375 A   12/1995  Korotky et al.
5,963,567 A   10/1999  Veselka et al.

(Continued)

OTHER PUBLICATIONS

Toshiaki Okuno et al., "Highly-nonlinear Optical Fibers and Their Applications" Information & Communication Systems, SEI Technical Review, No. 62, pp. 34-40, Jun. 2006.

(Continued)

*Primary Examiner* — Daniel Petkovsek
(74) *Attorney, Agent, or Firm* — Rabin & Berdo, P.C.

(57) ABSTRACT

A method of operating a wavelength swept source apparatus includes generating a single mode light, and generating a basic optical comb including light rays having identical frequency differences with adjacent light rays by modulating the generated single mode light. The method further includes generating other optical combs that include the same number of light rays as that of light rays of the optical comb that has a frequency band different from that of the basic optical comb, and is distributed in a frequency band wider than that in which the basic optical comb is distributed, by modulating the light rays of the basic optical comb. The light rays of the basic optical comb and the light rays included in the other optical combs are sequentially emitted according to frequencies of the light rays of the basic optical comb and the light rays included in the other optical combs.

13 Claims, 8 Drawing Sheets

(56) References Cited

U.S. PATENT DOCUMENTS

| | | |
|---|---|---|
| 6,081,355 A | 6/2000 | Sharma et al. |
| 7,239,442 B2 | 7/2007 | Kourogi et al. |
| 7,953,303 B2 * | 5/2011 | Gheorma .............. G02F 1/2255 385/2 |
| 8,023,537 B2 | 9/2011 | Inoue |
| 8,724,204 B2 | 5/2014 | Qiu et al. |
| 9,002,145 B2 | 4/2015 | Sudo et al. |
| 9,106,325 B2 | 8/2015 | Ataie et al. |
| 2015/0002918 A1 | 1/2015 | Kwon et al. |

OTHER PUBLICATIONS

Ioan L. Gheorma et al., "Flat Frequency Comb Generation With an Integrated Dual-Parallel Modulator" IEEE Photonics Technology Letters, vol. 19, No. 13, pp. 1011-1013, Jul. 2007.

Takahide Sakamoto et al., "19×10-GHz Electro-Optic Ultra-Flat Frequency Comb Generation Only Using Single Conventional Mach-Zehnder Modulator" OSA/CLEO, 2006.

R. P. Scott et al., "3.5-THz Wide, 175 Mode Optical Comb Source" OSA/OFC, 2007.

* cited by examiner

METHOD OF OPERATING WAVELENGTH SWEPT SOURCE APPARATUS

CROSS-REFERENCE TO RELATED APPLICATIONS

This application is a divisional of co-pending application Ser. No. 14/104,454 filed on Dec. 12, 2013, and claims priority to and the benefit of Korean Patent Application No. 10-2013-0070374, filed on Jun. 19, 2013, the disclosure of which is incorporated herein by reference in its entirety.

BACKGROUND OF THE INVENTION

1. Technical Field

The inventive concept relates to a wavelength tunable light source apparatus, and more particularly, to a wavelength swept source apparatus for sequentially and rapidly emitting a plurality of light rays having different frequencies.

2. Description of Related Art

A wavelength swept source apparatus sequentially emits a plurality of rays having different frequencies. The wavelength swept source apparatus is used in various fields such as the fields of a real-time optical coherent tomography (OCT) instrument for monitoring an industrial process, a medical three-dimensional OCT instrument, a light source for optical communication, a semiconductor analyzer, a polymer analysis spectrometer, and a light source for an environmental gas monitoring apparatus.

The wavelength swept source apparatus may be construed as one type of a wavelength tunable light source apparatus, in a broad sense. The wavelength swept source apparatus may be classified into a bulk optics type, a fiber optics type, and a semiconductor integrated optical element type, according to a type of a resonator. According to the bulk optics type apparatus, a wavelength of light may be changed within an optical gain bandwidth of a light source, a resonator may be easily implemented, and an optical loss is small. However, the bulk optics type apparatus needs precise optical alignment and has a large volume. Moreover, the bulk optics type apparatus has low reliability due to its strong mechanical vibration.

According to the fiber optics type apparatus, the wavelength swept source apparatus may be implemented in various configurations and forms according to linear or nonlinear characteristics of an optical fiber. However, the fiber optics type apparatus has a large volume and includes a large number of components, accordingly, has high unit cost of the apparatus. Furthermore, when a frequency of light outputted from the fiber optics type apparatus varies rapidly, intensity of the output light is reduced and linewidth of the output light is broadened.

The semiconductor-integrated optical element type apparatus has a small volume and high reliability, and may be manufactured cost-effectively. However, according to the semiconductor-integrated optical element type apparatus, an oscillation mode may be discontinuously switched while a wavelength is tuned, i.e., a mode hopping phenomenon may occur. Moreover, according to the semiconductor integrated optical element type apparatus, a method to change a frequency is complicated.

In the past, each of the above-mentioned implementation types had distinctly different performance, advantages, and disadvantages. Thus, each of the implementation types was applied to different fields. However, according to the development of implementation technology and the improvement of apparatus performance, the limitations of each of the implementation types have been recently overcome. Accordingly, the fields to which each of the implementation types are applied overlap with each other.

The OCT or automatic optical inspection (AOI) system using the wavelength swept source apparatus needs to provide a high-definition image in real time. In these systems, an apparatus for rapidly changing a frequency of output light should be used. A tuning rate of about 1 MHz or higher is required so that these systems provide at least five sheets of a high-definition three-dimensional image per second. However, the typical implementation types have limitations in terms of a frequency changing speed of output light and operation stability. Thus, the typical implementation types have a tuning rate of several tens to several hundreds of kHz.

SUMMARY OF THE INVENTION

The inventive concept provides a wavelength swept source apparatus having a different structure from that of a typical wavelength swept source apparatus, and a method for operating thereof. According to an embodiment of the inventive concept, limitations of the typical wavelength swept source apparatus may be overcome. That is, the wavelength swept source apparatus according to the inventive concept may sequentially emit a plurality of light rays having different frequencies stably and rapidly.

One embodiment of the inventive concept may provide wavelength swept source apparatuses including: a light source configured to generate single mode light; an optical comb generation unit configured to generate a basic optical comb comprising a plurality of light rays having identical frequency differences with adjacent light rays by modulating the generated single mode light; a frequency band extension unit configured to generate a plurality of optical combs by modulating the plurality of light rays, wherein each of the plurality of optical combs comprises same number of light rays as the plurality of light rays, each of the same number of light rays has identical frequency differences with adjacent light rays, each of the plurality of optical combs does not overlap the basic optical comb and has a different frequency band from that of the basic optical comb, and the plurality of optical combs is distributed in a wider frequency band than that in which the basic optical comb is distributed; and a light emission unit configured to sequentially emit the plurality of light rays and light rays included in the plurality of optical combs according to frequencies of the plurality of light rays and the light rays included in the plurality of optical combs.

In one embodiment, each of the plurality of light rays may be a harmonic wave of the generated single mode light. In this embodiment, the optical comb generation unit may include one of a double electrode Mach-Zehnder modulator, and an intensity modulator and a phase modulator which are connected to each other in series. In this embodiment, one of the double electrode Mach-Zehnder modulator, and the intensity modulator and the phase modulator which are connected to each other in series may be formed by one of a light waveguide structure and a structure integrated on a same substrate as that of the light source.

In one embodiment, the frequency band extension unit may be formed of a medium having a self-phase modulation characteristic. In this embodiment, the frequency band extension unit may be formed of one of a high nonlinear fiber and a photonic crystal fiber.

In one embodiment, the light emission unit may sequentially emit the plurality of light rays and the light rays included in the plurality of optical combs according to a group velocity dispersion characteristic of a medium. In this embodiment, the light emission unit may be formed of one of a dispersive fiber and a dispersion shifted fiber.

In one embodiment, the light emission unit may include a dispersion controller configured to adjust an interval between each time at which each of the plurality of light rays and the light rays included in the plurality of optical combs is emitted.

In one embodiment, the wavelength swept source apparatus may further include a polarization controller configured to control a polarization characteristic of input light and/or output light of the optical comb generation unit.

In one embodiment, the wavelength swept source apparatus may further include an optical amplifier or optical attenuator configured to adjust intensity of output light of the optical comb generation unit.

In one embodiment, the wavelength swept source apparatus may further include an isolator connected to an output terminal of the light emission unit to block reflected light.

Other embodiment of the inventive concept may provide a method for operating a wavelength swept source apparatus including: generating single mode light; generating a basic optical comb comprising a plurality of light rays having identical frequency differences with adjacent light rays by modulating the generated single mode light; generating a plurality of optical combs by modulating the plurality of light rays, wherein each of the plurality of optical combs comprises same number of light rays as the plurality of light rays, each of the same number of light rays has identical frequency differences with adjacent light rays, each of the plurality of optical combs does not overlap the basic optical comb and has a different frequency band from that of the basic optical comb, and the plurality of optical combs is distributed in a wider frequency band than that in which the basic optical comb is distributed; and sequentially emitting the plurality of light rays and light rays included in the plurality of optical combs according to frequencies of the plurality of light rays and the light rays included in the plurality of optical combs.

In some embodiments, each of the plurality of light rays may be a harmonic wave of the generated single mode light.

In other embodiments, the generating of the plurality of optical combs may include generating the plurality of optical combs according to a self-phase modulation characteristic of a medium.

In still other embodiments, the emitting may include sequentially emitting the plurality of light rays and the light rays included in the plurality of optical combs according to a group velocity dispersion characteristic of a medium.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF PREFERRED EMBODIMENTS

The above-described characteristics and the following detailed description are merely examples for helping the understanding of the inventive concept. That is, the inventive concept may be embodied in different forms and should not be constructed as limited to the embodiments set forth herein. The following embodiments are merely examples for completely disclosing the inventive concept and for delivering the inventive concept to those skilled in the art that the inventive concept belongs. Therefore, in the case where there are multiple methods for implementing the elements of the inventive concept, the inventive concept may be implemented with any of the methods or an equivalent thereof.

When it is mentioned that a certain configuration includes a specific element or a certain process includes a specific step, another element or another step may be further included. That is, the terms used herein are not for limiting the concept of the inventive concept, but for describing a specific embodiment. Furthermore, the embodiments described herein include complementary embodiments thereof.

The terms used herein have meanings that are generally understood by those skilled in the art. The commonly used terms should be consistently interpreted according to the context of the specification. Furthermore, the terms used herein should not be interpreted as overly ideal or formal meanings, unless the meanings of the terms are clearly defined. Hereinafter, the embodiments of the inventive concept will be described with reference to the accompanying drawings.

Figure 1:
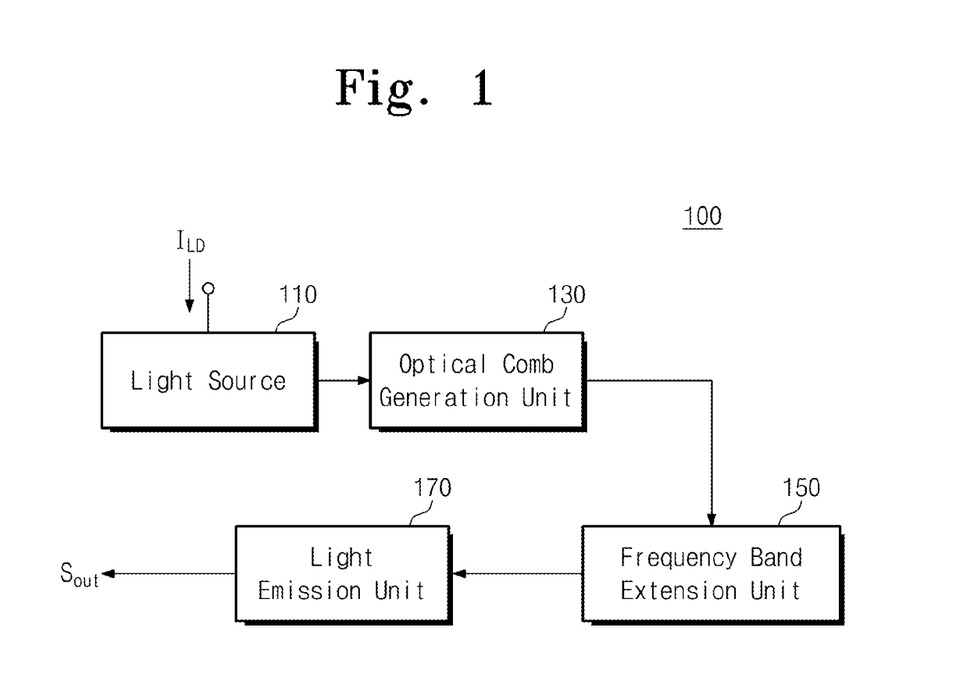
FIG. 1 is a block diagram illustrating a configuration of a wavelength swept source apparatus according to an embodiment of the inventive concept.

FIG. 1 is a block diagram illustrating a configuration of a wavelength swept source apparatus according to an embodiment of the inventive concept. A wavelength swept source apparatus 100 includes a light source 110, an optical comb generation unit 130, a frequency band extension unit 150, and a light emission unit 170.

The light source 110 may generate single mode light. The light source 110 may be a longitudinal single mode laser diode for generating a laser having a single frequency. For instance, the light source 110 may be formed as any one of a distributed feedback laser diode, a distributed Bragg reflector laser diode, and an external cavity laser. In this case, the light source 110 may operate by being supplied with a laser diode current $I_{LD}$, and generate the single mode light.

In FIG. 1, it is assumed that the light source 110 is the longitudinal single mode laser diode operating by being supplied with the laser diode current. This assumption is not for limiting the scope of the inventive concept, but for illustrating the inventive concept. That is, the light source 110 may have any form for generating the single mode light.

The optical comb generation unit 130 may be provided with the single mode light generated by the light source 110. The optical comb generation unit 130 may generate a basic optical comb by modulating the single mode light. The basic optical comb includes a plurality of light rays having different frequencies. The plurality of light rays included in the basic optical comb has the same frequency difference with an adjacent ray.

The optical comb generation unit 130 may generate the plurality of light rays having different frequencies using a method of mode locking or a method of generating a harmonic wave through phase modulation. Particularly, when the method of generating the harmonic wave is used, a center frequency is determined by a frequency of the single mode light generated by the light source 110, and the frequency of the single mode light is not changed. Furthermore, when the method of generating the harmonic wave is used, a frequency interval between each of the plurality of light rays included in the basic optical comb is determined by a modulation frequency, and thus adjustment of the frequency interval is not difficult. Moreover, when the method of generating the harmonic wave is used, the plurality of light rays included in the basic optical comb may be adjusted to have a uniform intensity, based on an amount of phase change and phase difference. That is, the method of generating the harmonic wave may be more useful than the method of mode locking.

When the method of generating a harmonic wave is used, each of the plurality of light rays included in the basic optical comb may be a harmonic wave of the single mode light generated by the light source 110. A conceptual configuration of the optical comb generation unit 130 using the method of generating the harmonic wave will be described later with reference to FIGS. 2 and 3. A characteristic of the plurality of light rays included in the basic optical comb will be described in more detail with reference to FIG. 4.

The frequency band extension unit 150 may be provided with the basic optical comb generated by the optical comb generation unit 130. The frequency band extension unit 150 may generate a plurality of optical combs by modulating the basic optical comb. Each of the plurality of optical combs includes light rays, the number of which is the same as that of the plurality of light rays included in the basic optical comb.

The light rays included in each of the plurality of optical combs have the same frequency difference with an adjacent light ray. There is a one-to-one correspondence between the light rays included in each of the plurality of optical combs and the plurality of light rays included in the basic optical comb. Frequency difference between a first light ray and a second light ray adjacent to the first light ray, among the plurality of light rays included in the basic optical comb, is the same as frequency difference between a light ray corresponding to the first light ray and a light ray corresponding to the second light ray, among the light rays included in each of the plurality of optical combs.

A frequency band in which the plurality of light rays included in the basic optical comb are distributed and a frequency band in which the light rays included in each of the plurality of optical combs are distributed do not overlap each other. As a result, the plurality of optical combs may be distributed in a wider frequency band than that in which the basic optical comb is distributed. A characteristic of the plurality of light rays included in the basic optical comb and the light rays included in each of the plurality of optical combs will be described in more detail with reference to FIG. 5.

An output of the frequency band extension unit 150 may seem as if the basic optical comb has been extended over a wider frequency band. The frequency band extension unit 150 may be formed of a medium exhibiting a four-wave mixing phenomenon or a medium having a nonlinear characteristic such as self-phase modulation characteristic. Particularly, the nonlinear characteristic is affected by intensity of light incident into the medium, a nonlinear coefficient, and length of the medium. The medium having the nonlinear characteristic may be formed of silica, silicon, group III-V semiconductor materials, or polymer materials. The medium having the nonlinear characteristic may have an optical waveguide structure or may be formed of an optical fiber. The nonlinear characteristic may be improved by modifying the materials of the medium or the structure of the optical waveguide or the optical fiber. For instance, the frequency band extension unit 150 may be formed of one of a high nonlinear fiber (HNLF) and a photonic crystal fiber, in which the self-phase modulation characteristic is maximized.

The light emission unit 170 may be provided with the basic optical comb and the plurality of optical combs generated by the frequency band extension unit 150. The light emission unit 170 may sequentially emit the plurality of light rays included in the basic optical comb and the light rays included in each of the plurality of optical combs, i.e., $S_{out}$. The light emission unit 170 may sequentially emit the light rays according to the frequencies thereof. For instance, the light emission unit 170 may sequentially emit the light rays using a group velocity dispersion characteristic of a medium.

A typical optical fiber has such a characteristic that a dispersion coefficient is changed according to an operating frequency. Therefore, when a plurality of light rays having different frequencies is transmitted through the optical fiber, the light rays are emitted with an interval of time. Additionally, the interval between each time at which each of the light rays is emitted may be adjusted by adjusting the length of the optical fiber. For instance, when the light emission unit 170 is formed of one of a dispersive fiber and a dispersion shifted fiber, the dispersion coefficient may be changed. A characteristic of the sequentially emitted light rays will be described in more detail with reference to FIG. 6.

Figure 2:
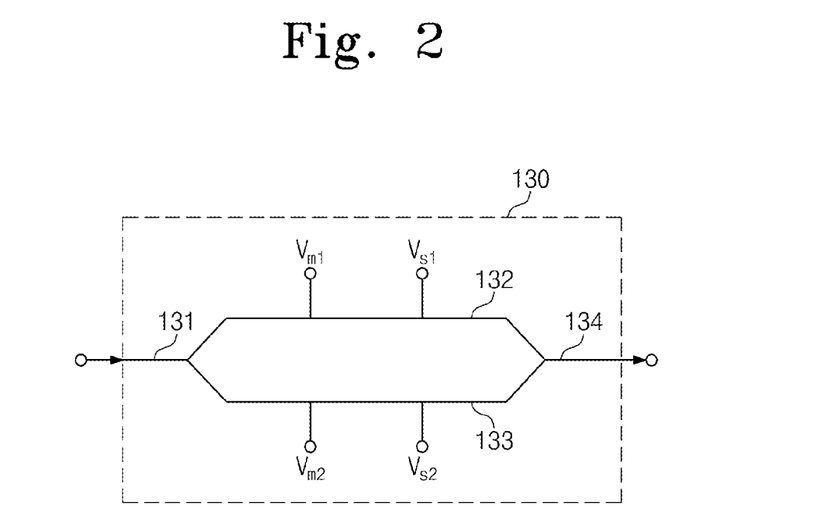
FIG. 2 is a conceptual diagram illustrating a configuration of an optical comb generation unit that may be included in an embodiment of the inventive concept.

FIG. 2 is a conceptual diagram illustrating a configuration of an optical comb generation unit that may be included in an embodiment of the inventive concept. Particularly, FIG. 2 illustrates a case where the optical comb generation unit 130 includes a double electrode Mach-Zehnder modulator (DEMZM).

The DEMZM of the optical comb generation unit 130 may include an input light waveguide 131, a first modulation unit 132, a second modulation unit 133, and an output light waveguide 134. The input light waveguide 131 may be provided with the single mode light generated by the light source 110 (refer to FIG. 1). A first modulation voltage $V_{m1}$ and a first static voltage $V_{s1}$ for phase control may be applied to the first modulation unit 132. A terminal resistance (not shown) may be connected to the first modulation unit 132. A second modulation voltage $V_{m2}$ and a second static voltage $V_{s2}$ for phase control may be applied to the second modulation unit 133. A terminal resistance (not shown) may also be connected to the second modulation unit 133. According to modulation results of the first modulation unit 132 and the second modulation unit 133, the output light waveguide 134 may generate the basic optical comb. The basic optical comb includes a plurality of light rays having different frequencies.

The optical comb generation unit 130 including the DEMZM may be formed by a light waveguide structure, which is composed of a semiconductor material, a polymer material, or $LiNO_3$. Alternatively, the optical comb generation unit 130 including the DEMZM may be integrated on the same substrate as that of the light source 110.

Figure 3:
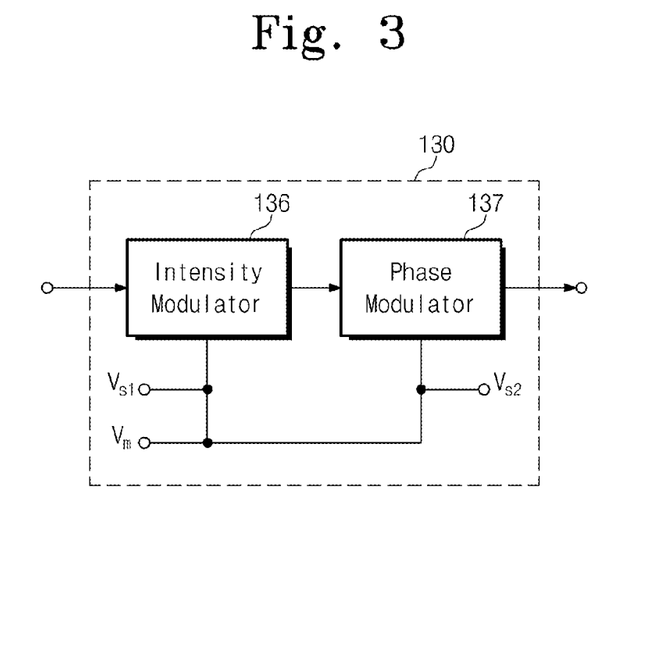
FIG. 3 is a conceptual diagram illustrating other configuration of an optical comb generation unit that may be included in an embodiment of the inventive concept.

FIG. 3 is a conceptual diagram illustrating other configuration of an optical comb generation unit that may be included in an embodiment of the inventive concept. Particularly, FIG. 3 illustrates a case where the optical comb generation unit 130 includes an intensity modulator 136 and a phase modulator 137 connected to each other in series.

The single mode light generated by the light source 110 (refer to FIG. 1) may be provided to the intensity modulator 136. The phase modulator 137 may receive a modulation result of the intensity modulator 136 and may generate the basic optical comb. The basic optical comb includes a plurality of light rays having different frequencies. A modulation voltage $V_m$, a first static voltage $V_{s1}$ for phase control, and a second static voltage $V_{s2}$ for phase control may be applied to the intensity modulator 136 and the phase modulator 137.

The optical comb generation unit 130 including the intensity modulator 136 and the phase modulator 137 connected in series may be formed by a light waveguide structure, which is composed of a semiconductor material, a polymer material, or $LiNO_3$. Alternatively, the optical comb generation unit 130 including the intensity modulator 136 and the phase modulator 137 connected in series may be integrated on the same substrate as that of the light source 110. The optical comb generation unit 130 of FIG. 3 includes single intensity modulator 136 and single phase modulator 137. However, the optical comb generation unit 130 may include a plurality of intensity modulators and a plurality of phase modulators in order to improve a form of the basic optical comb outputted from the optical comb generation unit 130.

The configurations described above with reference to FIGS. 2 and 3 are merely exemplary configurations that the optical comb generation unit 130 may have. The configuration of the optical comb generation unit 130 is not limited to the configurations illustrated in FIGS. 2 and 3. The optical comb generation unit 130 may have a different configuration from the configurations illustrated in FIGS. 2 and 3.

Figure 4:
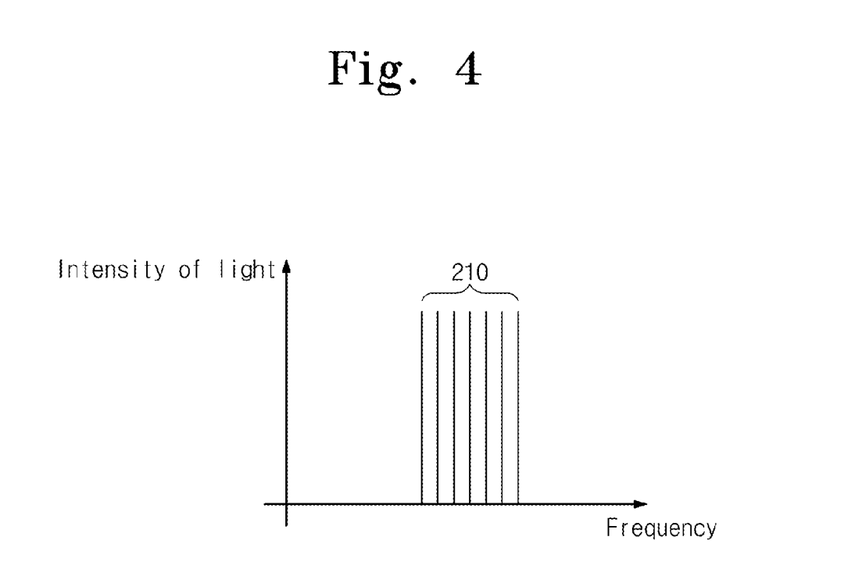
FIG. 4 is a graph illustrating a characteristic of light outputted from an optical comb generation unit that may be included in an embodiment of the inventive concept.

FIG. 4 is a graph illustrating a characteristic of light outputted from an optical comb generation unit that may be included in an embodiment of the inventive concept. That is, a characteristic of the plurality of light rays included in the basic optical comb is described with reference to FIG. 4.

When the single mode light generated by the light source 110 (refer to FIG. 1) is modulated by the optical comb generation unit 130 (refer to FIG. 1), a plurality of light rays may be generated. The plurality of generated light rays may form a basic optical comb 210. The plurality of light rays included in the basic optical comb 210 has different frequencies. When the method of generating the harmonic wave is used by the optical comb generation unit 130, the plurality of light rays may be adjusted to have a uniform intensity according to an amount of phase change and phase difference. However, FIG. 4 merely illustrates an example of the characteristic of the plurality of light rays included in the basic optical comb 210. The number of light rays, the intensity of light rays, and a frequency interval may be changed according to a setting of the optical comb generation unit 130.

Figure 5:
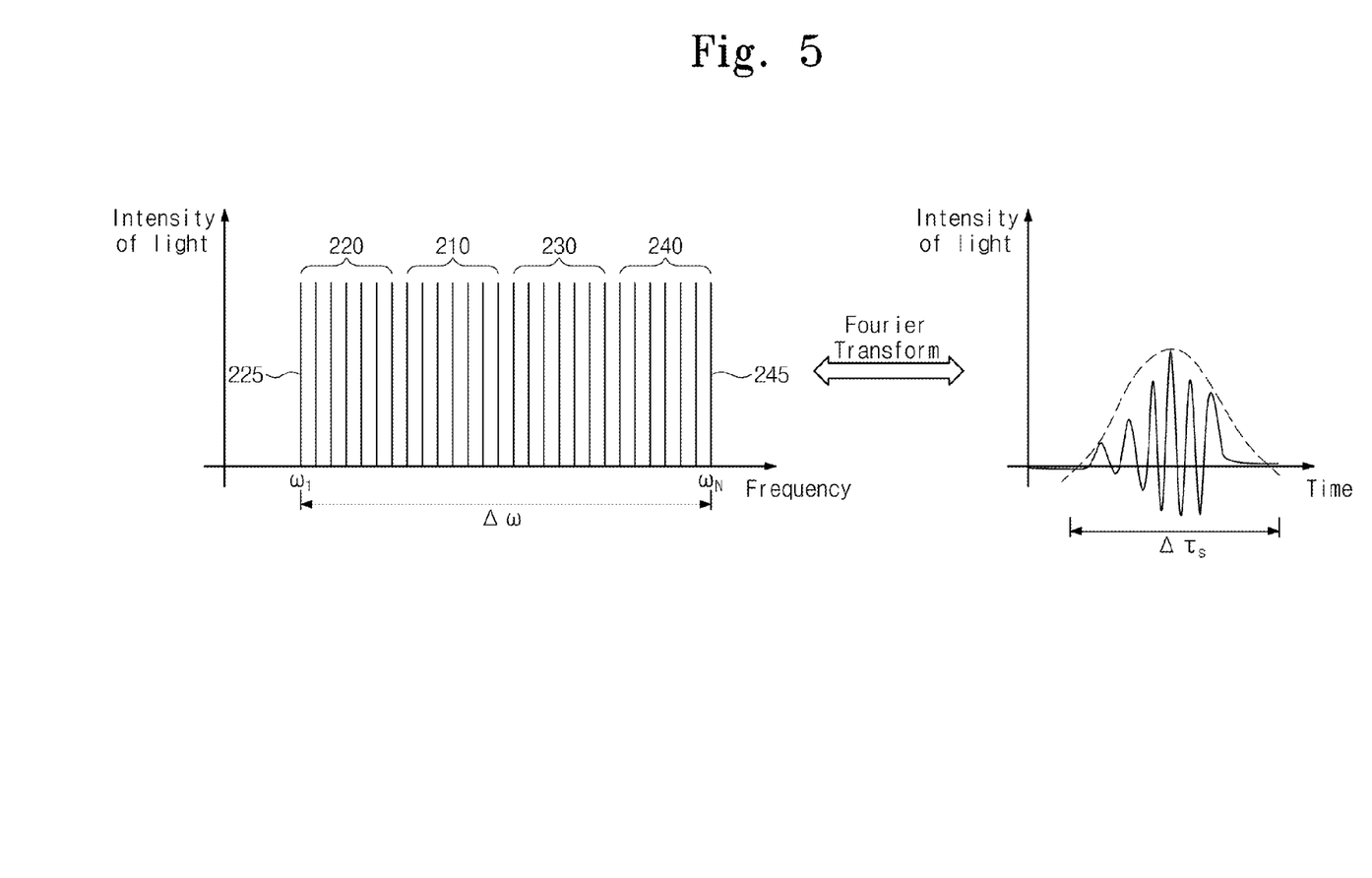
FIG. 5 is a graph illustrating a characteristic of light outputted from a frequency band extension unit that may be included in an embodiment of the inventive concept.

FIG. 5 is a graph illustrating a characteristic of light outputted from a frequency band extension unit that may be included in an embodiment of the inventive concept. That is, a characteristic of the plurality of light rays included in the basic optical comb and the light rays included in each of the plurality of optical combs is described with reference to FIG. 5.

When the basic optical comb 210 generated by the optical comb generation unit 130 (refer to FIG. 1) is modulated by the frequency band extension unit 150 (refer to FIG. 1), a plurality of optical combs 220, 230, and 240 may be generated. The basic optical comb 210 may form, together with the plurality of optical combs 220 to 240, an optical comb distributed in a wider frequency band $\Delta\omega$.

Each of the plurality of optical combs 220 to 240 includes light rays, the number of which is the same as that of the plurality of light rays included in the basic optical comb 210. The light rays included in each of the plurality of optical combs 220 to 240 have the same frequency difference with an adjacent light ray. There is a one-to-one correspondence between the light rays included in each of the plurality of optical combs 220 to 240 and the plurality of light rays included in the basic optical comb 210. A frequency band in which the plurality of light rays included in the basic optical comb 210 are distributed and a frequency band in which the light rays included in each of the plurality of optical combs 220 to 240 are distributed do not overlap each other.

Frequency difference between a first light ray and a second light ray adjacent to the first light ray, among the plurality of light rays included in the basic optical comb 210, is the same as frequency difference between a light ray corresponding to the first light ray and a light ray corresponding to the second light ray, among the light rays included in each of the plurality of optical combs 220 to 240. The plurality of light rays included in the basic optical comb 210 and the light rays included in each of the plurality of optical combs 220 to 240 have different frequencies. One of the basic optical comb 210 and the plurality of optical combs 220 to 240 includes a light ray 225 having the lowest frequency $\omega_1$ or a light ray 245 having the highest frequency $\omega_N$.

An output of the frequency band extension unit 150 has a wavelet waveform in time domain. The output of the frequency band extension unit 150 has an envelope of a time width $\Delta\tau_s$ which is inversely proportional to a linewidth of an optical comb in time domain. However, FIG. 5 merely illustrates an example of the characteristic of the plurality of light rays included in the basic optical comb 210 and the light rays included in each of the plurality of optical combs 220 to 240. The number of light rays, the intensity of light rays, and a frequency interval may be changed according to a setting of the frequency band extension unit 150.

Figure 6:
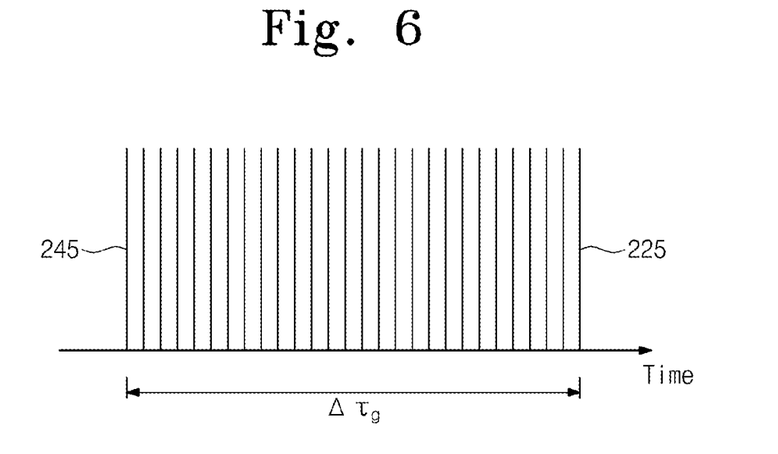
FIG. 6 is a graph illustrating a characteristic of light emitted from a light emission unit that may be included in an embodiment of the inventive concept.

FIG. 6 is a graph illustrating a characteristic of light emitted from a light emission unit that may be included in an embodiment of the inventive concept. That is, the characteristic of the sequentially outputted light rays is described with reference to FIG. 6.

When the basic optical comb 210 (refer to FIG. 4) generated by the optical comb generation unit 130 (refer to FIG. 1) and the plurality of optical combs 220 to 240 (refer to FIG. 5) generated by the frequency band extension unit 150 (refer to FIG. 1) pass through the light emission unit 170 (refer to FIG. 1), each of light rays included in the basic optical comb 210 and the plurality of optical combs 220 to 240 are sequentially emitted. The light emission unit 170 may sequentially emit the light rays according to the frequencies thereof. That is, the light emission unit 170 may sequentially emit the light rays from the light ray 245 having the highest frequency to the light ray 225 having the lowest frequency in a time sequence.

However, FIG. 6 merely illustrates an example of the characteristic of the sequentially emitted light rays. An interval $\Delta\tau_g$ between a time at which the light ray 245 having the highest frequency is emitted and a time at which the light ray 225 having the lowest frequency is emitted, and an interval between each time at which each light ray is emitted may be changed according to a dispersion characteristic of the light emission unit 170.

Figure 7:
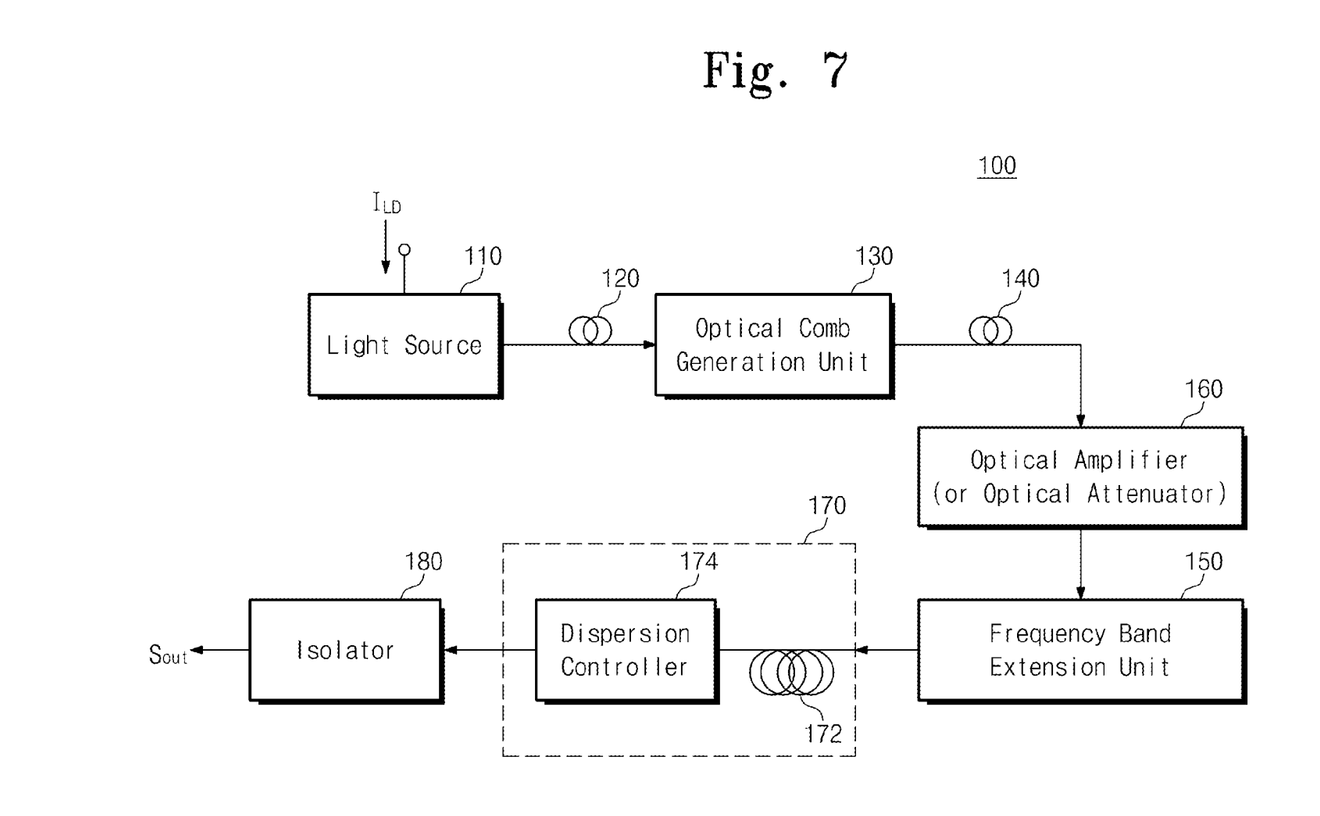
FIG. 7 is a block diagram illustrating other configuration of a wavelength swept source apparatus according to an embodiment of the inventive concept.

FIG. 7 is a block diagram illustrating other configuration of a wavelength swept source apparatus according to an embodiment of the inventive concept. A wavelength swept source apparatus 100 includes a light source 110, polarization controllers 120 and 140, an optical comb generation unit 130, an optical amplifier or optical attenuator 160, a frequency band extension unit 150, a light emission unit 170, and an isolator 180. The light source 110, the optical comb generation unit 130, the frequency band extension unit 150, and the light emission unit 170 have the same structures and functions as the light source 110, the optical comb generation unit 130, the frequency band extension unit 150, and the light emission unit 170 included in the wavelength swept source apparatus 100 of FIG. 1. Therefore, overlapping descriptions will be omitted.

The single mode light generated by the light source 110 is provided to the optical comb generation unit 130. The optical comb generation unit 130 generates the basic optical comb by modulating the single mode light. If the optical comb generation unit 130 has such characteristic that it passes a specific polarization component, the polarization controllers 120 and 140 may be connected to input and output terminals of the optical comb generation unit 130, respectively. The polarization controllers 120 and 140 may control a polarization characteristic of input light and/or output light of the optical comb generation unit 130.

The optical amplifier or optical attenuator 160 may be connected to an output terminal of the optical comb generation unit 130. The optical amplifier or optical attenuator 160 may adjust intensity of output light of the optical comb generation unit 130 according to a set gain value. When the optical amplifier is connected to the output terminal of the optical comb generation unit 130, the intensity of the output light of the optical comb generation unit 130 may be amplified. When the optical attenuator is connected to the output terminal of the optical comb generation unit 130, the intensity of the output light of the optical comb generation unit 130 may be attenuated. The optical amplifier or optical attenuator 160 may provide the amplified or attenuated output light of the optical comb generation unit 130 to the frequency band extension unit 150.

In FIG. 7, the optical amplifier or optical attenuator 160 is connected to an output terminal of the polarization controller 140. However, the optical amplifier or optical attenuator 160 may also be connected between the optical comb generation unit 130 and the polarization controller 140. Furthermore, it would be obvious that the optical amplifier or optical attenuator 160 may be used to amplify or attenuate intensity of output light of any component other than the optical comb generation unit 130. That is, the connecting the optical amplifier or optical attenuator 160 to the output terminal of the optical comb generation unit 140 is merely an example for describing the inventive concept.

The light emission unit 170 may include a dispersive fiber 172 and a dispersion controller 174. The dispersive fiber 172 may sequentially output the plurality of light rays included in the basic optical comb generated by the optical comb generation unit 130 and the light rays included in each of the plurality of optical combs generated by the frequency band extension unit 150, according to frequencies thereof. An interval between each time at which each of the light rays is emitted may be changed according to a dispersion characteristic of the dispersive fiber 172.

The dispersion controller 174 may control the interval between each time at which each of the light lays is emitted from the light emission unit 170. The interval between each time at which each of the light rays is emitted from the light emission unit 170 is greatly affected by the dispersion characteristic of the dispersive fiber 172. However, the interval between each time at which each of the light lays is emitted from the light emission unit 170 may need to be further adjusted, so that wavelength sweeping is appropriately performed. The dispersion controller 174 controls the interval between each time at which each of the light lays is emitted from the light emission unit 170. A characteristic of the light rays emitted from the dispersion controller 174 will be described in more detail with reference to FIG. 8.

The isolator 180 may block reflected light from outside of the wavelength swept source apparatus 100. The isolator 180 may be connected to an output terminal of the light emission unit 170. The effect of the light reflected from the outside of the wavelength swept source apparatus 100 may be reduced by connecting the isolator 180.

Figure 8:
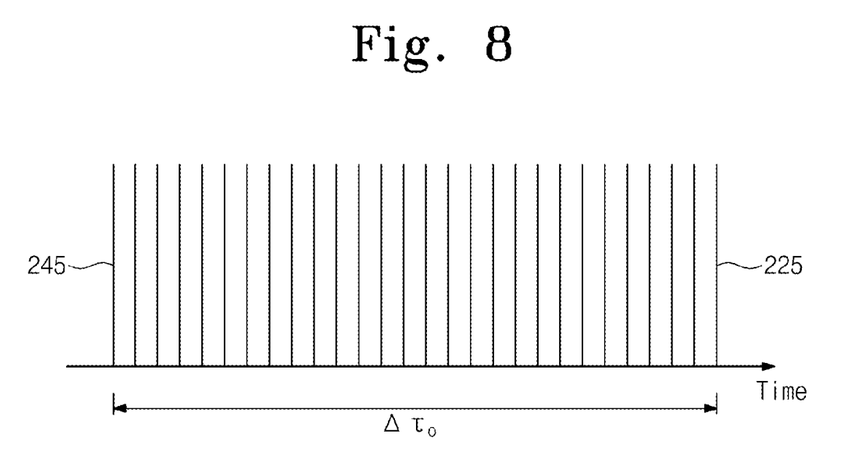
FIG. 8 is a graph illustrating a characteristic of light outputted from a dispersion controller that may be included in an embodiment of the inventive concept.

FIG. 8 is a graph illustrating a characteristic of light outputted from a dispersion controller that may be included in an embodiment of the inventive concept.

When the basic optical comb 210 (refer to FIG. 4) generated by the optical comb generation unit 130 (refer to FIG. 7) and the plurality of optical combs 220 to 240 (refer to FIG. 5) generated by the frequency band extension unit 150 (refer to FIG. 7) pass through the dispersive fiber 172 (refer to FIG. 7), each of the light rays is sequentially emitted. When the sequentially emitted light rays pass through the dispersion controller 174 (refer to FIG. 7), an interval between each time at which each of the light rays is emitted may be adjusted.

As a result, an interval $\Delta \tau_o$ between the time at which the light ray 245 having the highest frequency is emitted and the time at which the light ray 225 having the lowest frequency is emitted may be adjusted. That is, the interval between the time at which the light ray 245 having the highest frequency is emitted and the time at which the light ray 225 having the lowest frequency is emitted may be changed according to a case where the dispersion controller 174 is connected (i.e. $\Delta \tau_o$) and a case where the dispersion controller 174 is not connected (i.e. $\Delta \tau_g$, refer to FIG. 6).

Figure 9:
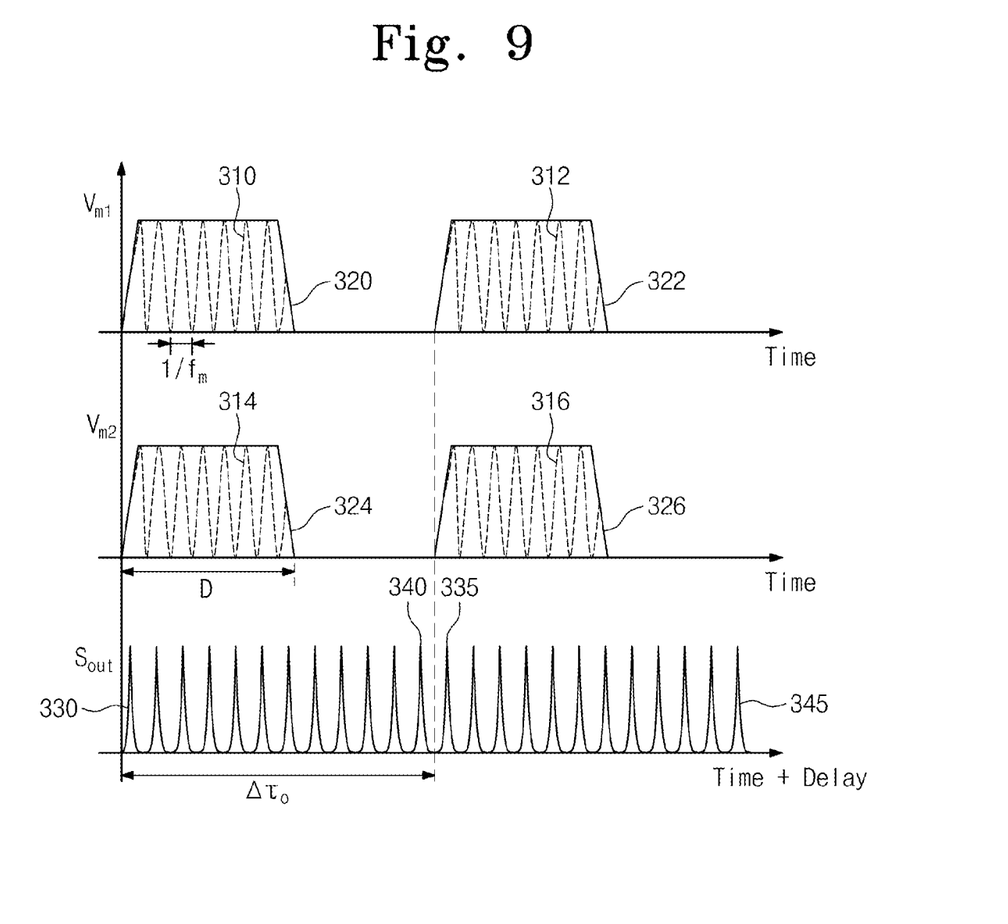
FIG. 9 is a graph illustrating a characteristic of a voltage applied to an optical comb generation unit and a characteristic of light emitted from a light emission unit according to an embodiment of the inventive concept.

FIG. 9 is a graph illustrating a characteristic of a voltage applied to an optical comb generation unit and a characteristic of light emitted from a light emission unit according to an embodiment of the inventive concept. In particular, FIG. 9 illustrates general forms of a first modulation voltage $V_{m1}$ and a second modulation voltage $V_{m2}$ applied to the optical comb generation unit 130 (refer to FIG. 1) and the output light $S_{out}$ of the wavelength swept source apparatus 100 (refer to FIG. 1). Here, FIG. 9 illustrates a case where the optical comb generation unit 130 includes a DEMZM. In the case where the optical comb generation unit 130 includes an intensity modulator 136 (refer to FIG. 3) and a phase modulator 137 (refer to FIG. 3) connected to each other in series, only one modulation voltage is applied to the optical comb generation unit 130.

The first modulation voltage and the second modulation voltage need to be appropriately set, so that wavelength sweeping is performed by the light rays emitted from the light emission unit 170 (refer to FIG. 1) at every specific period of $\Delta \tau_o$. The first modulation voltage and the second modulation voltage may be determined according to a modulation frequency $f_m$ and a modulation signal width D.

The first modulation voltage may include modulation signals 310 and 312 (hereinafter referred to as optical comb generation signals) for generating an optical comb based on the single mode light, and may include signals 320 and 322 (hereinafter referred to as wavelength sweeping signals) for performing periodic wavelength sweeping. The optical comb generation signals 310 and 312 have the modulation frequency $f_m$. Therefore, the optical comb generation signals 310 and 312 have a period corresponding to the reciprocal of the modulation frequency (i.e. $1/f_m$) in time domain.

The period of the wavelength sweeping signals 320 and 322 needs to be synchronized with the wavelength sweeping period $\Delta\tau_o$ of the light rays emitted from the light emission unit 170. In general, the modulation signal width D in which the wavelength sweeping signals 320 and 322 are applied needs to be greater than the reciprocal of the modulation frequency (i.e. $1/f_m$). Furthermore, the modulation signal width D needs to be greater than the time width $\Delta\tau_s$ (refer to FIG. 5) of the envelope of the output of the frequency band extension unit 150 (refer to FIG. 1) in time domain. Moreover, the modulation signal width D needs to be smaller than the wavelength sweeping period $\Delta\tau_o$ of the light rays emitted from the light emission unit 170, so that the periodic wavelength sweeping is appropriately performed.

The second modulation voltage may include optical comb generation signals 314 and 316 and wavelength sweeping signals 324 and 326. The first modulation voltage and the second modulation voltage may have the same modulation frequency $f_m$ and the same modulation signal width D, and may have different magnitude from each other. That is, the characteristics of the second modulation voltage are similar to those of the first modulation voltage. Thus, detailed descriptions of the second modulation voltage are omitted.

As an embodiment, an optical switch may be connected to the output terminal of the optical comb generation unit 130 of FIG. 1. If the switch is switched according to the wavelength sweeping period $\Delta\tau_o$ and the modulation signal width D, the wavelength sweeping signals 320, 322, 324, and 326 included in the first and second modulation voltages may be generated.

The output light $S_{out}$ of the wavelength swept source apparatus 100 may be obtained after a lapse of a certain period of time after the first and second modulation voltages are applied. This is because a delay occurs while the optical comb travels to an output terminal through a medium after the first and second modulation voltages are applied. The delay is reflected to the horizontal axis of the graph with respect to the output light $S_{out}$.

The wavelength swept source apparatus 100 may sequentially emit light rays from light rays 330 and 335 having the highest frequency to light rays 340 and 345 having the lowest frequency. The output of the wavelength swept source apparatus 100 may have a specific period $\Delta\tau_o$. That is, the wavelength swept source apparatus 100 may emit the light rays from the light ray 330 having the highest frequency to the light ray 340 having the lowest frequency, and then may emit the light rays from the light ray 335 having the highest frequency to the light ray 345 having the lowest frequency again. This process is repeated at the specific period $\Delta\tau_o$, so that periodic wavelength sweeping may be performed.

The value of the laser diode current $I_{LD}$ (refer to FIG. 1), the values of the first and second modulation voltages, the modulation frequency $f_m$, the modulation signal width D, and the dispersion characteristics of the dispersion controller 174 (refer to FIG. 7) may need to be appropriately adjusted, so that the wavelength sweeping is performed at the specific period $\Delta\tau_o$. However, the output order of the light rays 330 and 335 having the highest frequency and the light rays 340 and 345 having the lowest frequency may be reversed according to a sign of a dispersion coefficient of the light emission unit 170.

That is, the graph with respect to the output light $S_{out}$ of FIG. 9 is merely an example for describing the inventive concept.

The above-mentioned wavelength swept source apparatus has a different structure from that of a typical wavelength swept source apparatus. The wavelength swept source apparatus according to an embodiment of the inventive concept has a simple structure and thus may be easily implemented. Furthermore, according to an embodiment of the inventive concept, a plurality of light rays having different frequencies may be emitted sequentially, stably and rapidly.

For example, if the wavelength swept source apparatus in which the frequency band extension unit 150 (refer to FIG. 1) is formed of a high nonlinear fiber (HNLF), a width of a wavelength area in which the optical comb outputted from the frequency band extension unit 150 is distributed is about 100 nm, the light emission unit 170 (refer to FIG. 1) is formed of an optical fiber of which a dispersion coefficient is about −50 ps/(km×nm), and length is 5 km, and the dispersion controller 174 (refer to FIG. 7) is not included is used, the wavelength sweeping period $\Delta\tau_o$ (refer to FIG. 9) of about 25 ns is obtained. That is, wavelength sweeping may be performed at a high speed according to a tuning rate of about 40 MHz.

Figure 10:
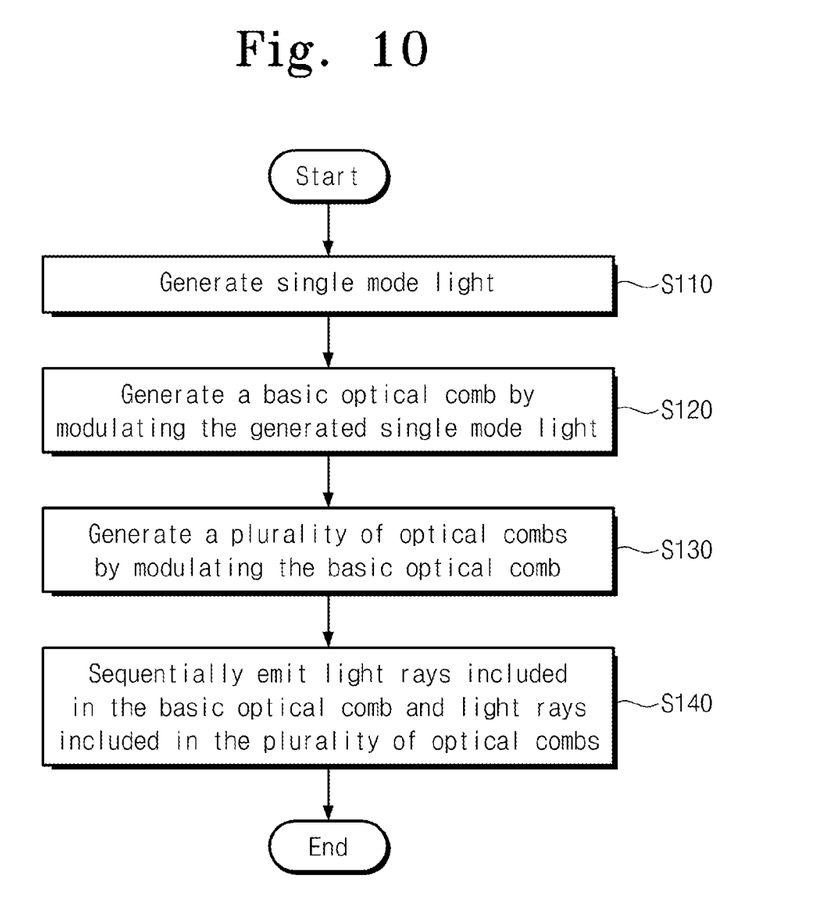
FIG. 10 is a flowchart illustrating a method for operating a wavelength swept source apparatus according to other embodiment of the inventive concept.

FIG. 10 is a flowchart illustrating a method for operating a wavelength swept source apparatus according to other embodiment of the inventive concept.

In operation S110, single mode light may be generated. The single mode light may be generated by a longitudinal single mode laser diode.

In operation S120, a basic optical comb may be generated based on the single mode light. The basic optical comb includes a plurality of light rays having different frequencies. Each of the plurality of light rays included in the basic optical comb has the same frequency difference with an adjacent light ray. In the case where the basic optical comb is generated using the method of generating a harmonic wave through phase modulation, each of the plurality of light rays included in the basic optical comb may be a harmonic wave of the single mode light.

In operation S130, a plurality of optical combs may be generated based on the basic optical comb. Each of the plurality of optical combs includes light rays, the number of which is the same as that of the plurality of light rays included in the basic optical comb. The light rays included in each of the plurality of optical combs have the same frequency difference with an adjacent light ray. There is a one-to-one correspondence between the light rays included in each of the plurality of optical combs and the plurality of light rays included in the basic optical comb. Frequency difference between a first light ray and a second light ray adjacent to the first light ray, among the plurality of light rays included in the basic optical comb, is the same as frequency difference between a light ray corresponding to the first light ray and a light ray corresponding to the second light ray, among the light rays included in each of the plurality of optical combs. Furthermore, a frequency band in which the plurality of light rays included in the basic optical comb are distributed and a frequency band in which the light rays included in each of the plurality of optical combs are distributed do not overlap each other. The plurality of optical combs may be generated according to a self-phase modulation characteristic of a medium.

In operation S140, the plurality of light rays included in the basic optical comb and the light rays included in each of the plurality of optical combs may be sequentially emitted. The plurality of light rays included in the basic optical comb and the light rays included in each of the plurality of optical combs may be sequentially emitted according to frequencies thereof. For instance, the plurality of light rays included in the basic optical comb and the light rays included in each of the plurality of optical combs may be sequentially emitted according to a group velocity dispersion characteristic of a medium.

According to the method for operating the wavelength swept source apparatus of an embodiment of the inventive concept, a plurality of light rays having different frequencies may be emitted sequentially, stably and rapidly. Furthermore, the method for operating the wavelength swept source apparatus of an embodiment of the inventive concept is not complicated and thus may be easily carried out.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method for operating a wavelength swept source apparatus, the method comprising:
    generating single mode light;
    generating a first modulation result of the generated single mode light;
    generating a second modulation result of the generated single mode light, the generating of the second modulation result being performed in parallel to the generating of the first modulation result;
    generating a basic optical comb based on the first modulation result and the second modulation result, the basic optical comb comprising a plurality of light rays having identical frequency differences with adjacent light rays;
    generating a plurality of optical combs by modulating the plurality of light rays, each of the plurality of optical combs including the same number of light rays as the plurality of light rays, each of the light rays included in the plurality of optical combs having identical frequency differences with adjacent light rays, each of the plurality of optical combs having a different frequency band from that of the basic optical comb, which does not overlap therewith, and the plurality of optical combs being distributed in a wider frequency band than that in which the basic optical comb is distributed; and
    sequentially emitting, from the wavelength swept source apparatus, the plurality of light rays and the light rays included in the plurality of optical combs according to frequencies of the plurality of light rays and the light rays included in the plurality of optical combs, over a lapse of time.

2. The method of claim 1, wherein each of the plurality of light rays is a harmonic wave of the generated single mode light.

3. The method of claim 1, wherein the generating of the plurality of optical combs comprises generating the plurality of optical combs according to a self-phase modulation characteristic of a medium.

4. The method of claim 1, wherein the emitting comprises sequentially emitting the plurality of light rays and the light rays included in the plurality of optical combs according to a group velocity dispersion characteristic of a medium.

5. The method of claim 1, wherein the generating of the basic optical comb comprises generating the basic optical comb using a double electrode Mach-Zehnder modulator (DEMZM).

6. The method of claim 1, wherein the emitting comprises sequentially emitting the plurality of light rays and the light rays included in the plurality of optical combs according to one of an increasing order or decreasing order of the frequencies of the plurality of light rays and the light rays included in the plurality of optical combs.

7. The method of claim 1, wherein
    the generating of the first modulation result comprises generating the first modulation result according to a first modulation voltage $V_{m1}$ and a first static voltage $V_{s1}$, and
    the generating of the second modulation result comprises generating the second modulation result according to a second modulation voltage $V_{m2}$ and a second static voltage $V_{s2}$.

8. The method of claim 7, wherein
    the first modulation voltage $V_{m1}$ includes a first optical comb generation signal and a first wavelength sweeping signal, and
    the second modulation voltage $V_{m2}$ includes a second optical comb generation signal and a second wavelength sweeping signal.

9. A method for a wavelength swept source apparatus, the method comprising:
    generating single mode light;
    generating a first modulation result of the generated single mode light;
    generating a second modulation result of the generated single mode light, the generating of the second modulation result being performed in parallel to the generating of the first modulation result;
    generating a basic optical comb based on the first modulation result and the second modulation result, the basic optical comb comprising a plurality of light rays, each of the light rays included in the basic optical comb being offset from their respective adjacent light rays by a frequency offset;
    generating a plurality of optical combs by modulating the plurality of light rays, each of the plurality of optical combs including the same number of light rays as the number of light rays in the basic optical comb, each of the light rays in the plurality of optical combs being offset from their respective adjacent light rays by the frequency offset, each of the plurality of optical combs having a different frequency band from a frequency band of the basic optical comb, which does not overlap therewith, and the plurality of optical combs being distributed in a wider frequency band than the frequency band of the basic optical comb; and
    sequentially emitting, from the wavelength swept source apparatus, the light rays in the basic optical comb and the plurality of optical combs according to their respective frequencies, over a lapse of time.

10. The method of claim 9, wherein the generating of the basic optical comb comprises generating the basic optical comb using a double electrode Mach-Zehnder modulator (DEMZM).

11. The method of claim 9, wherein the emitting comprises sequentially emitting the light rays in the basic optical comb and the plurality of optical combs according to one of an increasing order or decreasing order of their respective frequencies.

12. The method of claim 9, wherein
    the generating of the first modulation result comprises generating the first modulation result according to a first modulation voltage $V_{m1}$ and a first static voltage $V_{s1}$, and the generating of the second modulation result comprises generating the second modulation result according to a second modulation voltage $V_{m2}$ and a second static voltage $V_{s2}$.

13. The method of claim 12, wherein
the first modulation voltage $V_{m1}$ includes a first optical comb generation signal, and
the second modulation voltage $V_{m2}$ includes a second optical comb generation signal.

* * * * *